United States Patent [19]

Manor

[11] E Re. 29,056

[45] Reissued Nov. 30, 1976

[54] MUSICAL INSTRUMENT

[76] Inventor: Doyle Manor, 432 Summit Drive, Henderson, Nev. 89015

[22] Filed: Feb. 4, 1976

[21] Appl. No.: 655,003

Related U.S. Patent Documents

Reissue of:

[64] Patent No.: 3,913,441
Issued: Oct. 21, 1975
Appl. No.: 550,636
Filed: Feb. 18, 1975

[52] U.S. Cl. ..... 84/1.16; 84/173; 84/327; 248/443

[51] Int. Cl.[2] ..... G10D 1/00; G10G 5/00; G10H 3/00

[58] Field of Search ..... 84/1.04, 1.14–1.16, 84/173, 267–269, 284, 285, 327, 453, DIG. 24; 248/443

[56] References Cited

UNITED STATES PATENTS

| | | | |
|---|---|---|---|
| 516,427 | 3/1894 | Bent | 84/269 |
| 934,068 | 9/1909 | Gray | 84/173 X |
| 1,679,834 | 8/1928 | Lentz | 84/173 X |
| 2,033,826 | 3/1936 | Haium | 84/173 |
| 2,168,736 | 8/1939 | Jones | 84/173 |
| 2,559,200 | 7/1951 | Schaf | 84/267 |
| 2,796,795 | 6/1957 | Bach | 84/173 |
| 2,837,953 | 6/1958 | Baschet | 84/173 X |
| 2,909,092 | 10/1959 | Armond et al. | 84/1.15 |
| 3,251,258 | 5/1966 | Parker | 84/453 |
| 3,575,078 | 4/1971 | Currier | 84/173 |

*Primary Examiner*—Stanley J. Witkowski
*Attorney, Agent, or Firm*—Robert E. Geauque

[57] ABSTRACT

A musical instrument having a base and an arm extending upwardly therefrom and a string extending over said arm and said base and connected at one end to the upper portion of the arm and at the lower end to a stand which pivotally supports the base, the string being located at a preset height over a pickup in the base by means of a guide located on the lower portion of the base.

5 Claims, 5 Drawing Figures

Fig. 1.
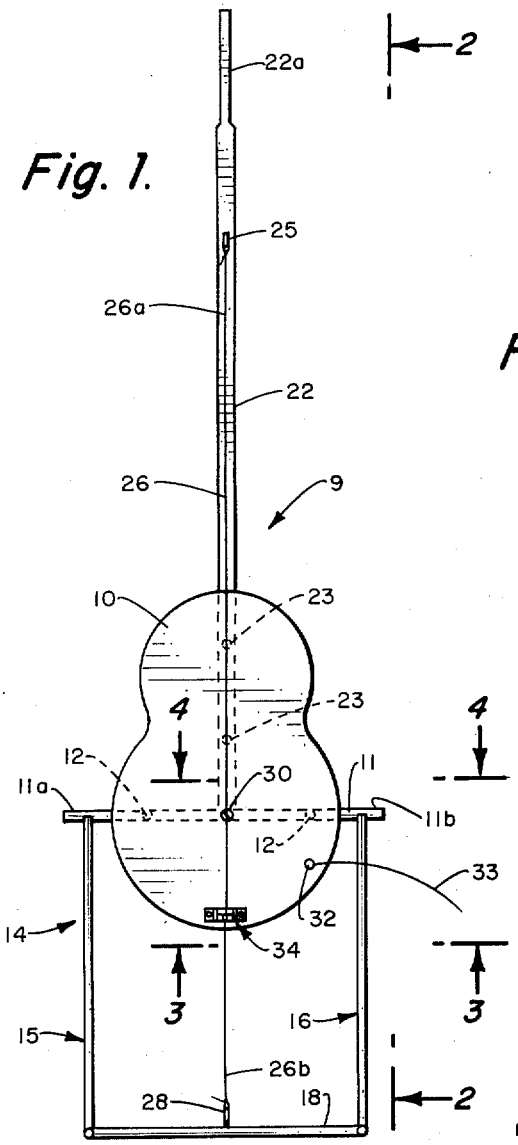
Fig. 2.
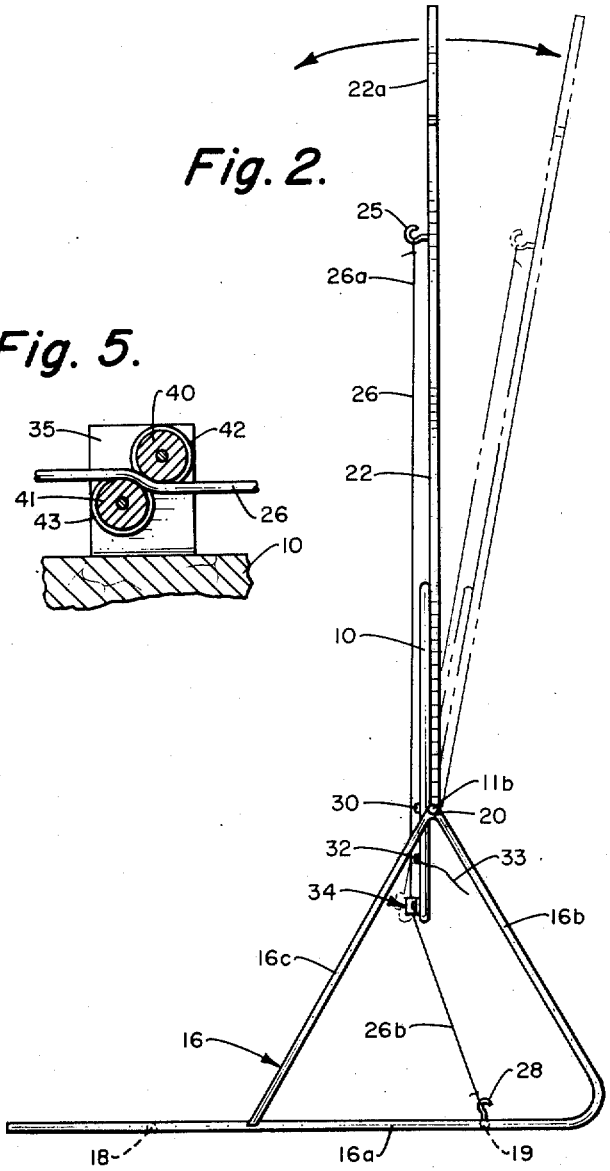
Fig. 5.
Fig. 3.
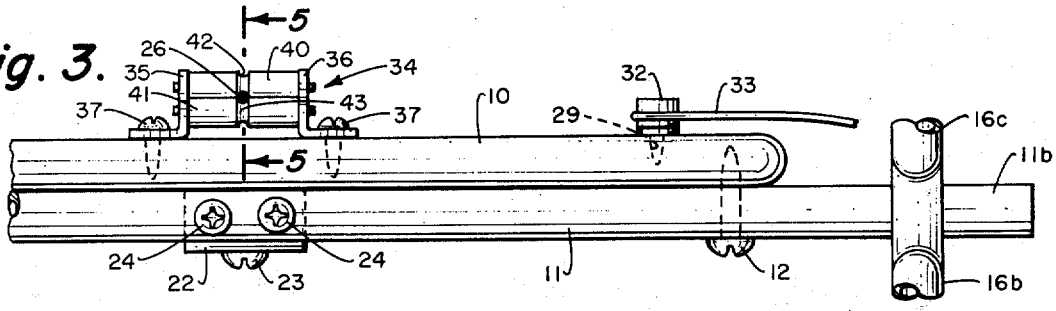
Fig. 4.
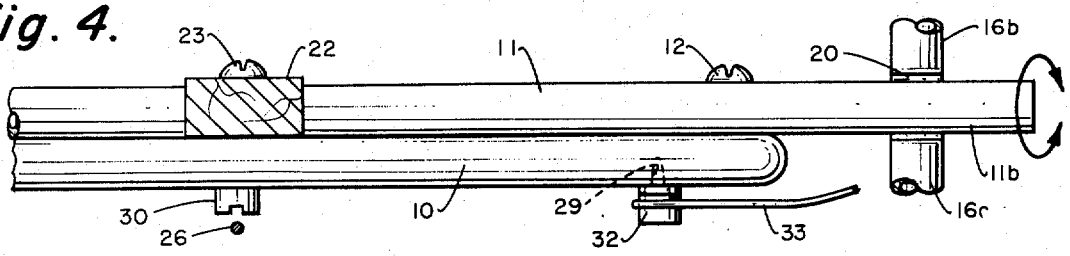

MUSICAL INSTRUMENT

Matter enclosed in heavy brackets [ ] appears in the original patent but forms no part of this reissue specification; matter printed in italics indicates the additions made by reissue.

BACKGROUND OF INVENTION

A type of musical instrument presently in use consists of a single string attached at one end to the bottom of an inverted tub and at the other end to a handle which pivots on the edge of the tub. The back and forth movement of the handle changes the tension on the string and varies the tone produced by picking or stroking the string. The tones are amplified by the wash tub serving as the sounding board. A structure of this type is illustrated in U.S. Pat. No. 2,861,494 and a modification is shown in U.S. Pat. No. 1,679,834 which utilizes a pitch fork with prongs secured to a box and strings supported along the length of the pitch fork. The constructions of these devices are not conducive to obtaining good tone quality which can be projected a distance from the instrument.

SUMMARY OF THE INVENTION

The improved instrument of the present invention incorporates the principle of tensioning a string to obtain different tones resulting from plucking or stroking of the string. However, the instrument is generally in the shape of a base guitar and comprises a base and a handle extending therefrom. The base is pivotally mounted on a stand for movement by the handle and a string is attached at one end to the upper end of the handle and at the other end to the stand. The string extends across the base and is guided by rollers at the lower edge of the base to connect with the bottom portion of the stand. Pivot arms extend to each side of the base and are supported in bearing surfaces on opposite sides of the support frame or stand. An amplifier pickup is located in the base and has an outlet at one side of the base for connection to a standard amplifying system. The guide rollers at the lower edge of the base maintain the string in proper alignment over the magnetic pickup and at a proper height over the magnetic pickup while still permitting the tension on the string to vary upon movement of the arm attached to the body. Thus, the invention provides a musical instrument utilizing a structure which permits the incorporation of a magnetic pickup in association with the string.

BRIEF DESCRIPTION OF THE DRAWINGS

FIG. 1 is a front elevational view of the musical instrument of the present invention showing the base pivotally mounted on a support stand;

FIG. 2 is a side elevational view taken from the right side of FIG. 1 showing the arm located in several positions;

FIG. 3 is a vertical section along line 3—3 of FIG. 1 showing the roller constructions at the lower edge of the base;

FIG. 4 is a horizontal section along line 4—4 of FIG. 1 showing the string located above the magnetic pickup and the electrical outlet for the pickup located at one edge of the base; and FIG. 5 is a vertical section along line 5—5 of FIG. 3 showing the guide rollers.

DESCRIPTION OF THE PREFERRED EMBODIMENT

The embodiment of the invention 9 chosen for purpose of illustration is shown in FIG. 1 and comprises a base 10 which can be constructed of wood and shaped to simulate the base of an electrical bass guitar. A substantially horizontal cross piece 11 extends transversely across the back of instrument base and is attached thereto by a plurality of screws 12. The cross piece 11 has ends 11a and 11b which extend on opposite sides of the base 10 in order to pivotally support the base on the stand 14. The stand 14 consists of identical side members 15 and 16, each of which can be formed from a single piece of rod or pipe. Side 16 is bent to form a base 16a and legs 16b and 16c and the end of the leg 16c can be secured to the base 16a in any suitable manner. See FIG. 2. The side 15 is formed in the identical manner and the sides 15 and 16 are connected together by cross pieces 18 and 19 in order to hold the frame sides rigidly spaced apart and in upright position. The apex at the top junction of each pair of legs is curved inwardly to form a semicircular bearing surface 20 and these bearing surfaces support ends 11a and 11b of cross piece 11. The base 10 is therefore free to rotate about the axis of the cross member 11 which in turn is rotatably supported by stand 14.

Arm 22 extends along the back of the base 10 from the cross piece 11 and is secured to the cross piece 11 by screws 24 passing vertically through the cross piece 11 and into the end of the arm 22. See FIG. 3. Also, the arm is secured to base 10 by screws 23 spaced vertically along the back side of the base. See FIGS. 3 and 4. The upper end 22a of arm 22 consists of a handle which can be gripped by the player of the instrument in order to rotate the instrument about the axis of the cross piece 11. A hook 25 is located at the upper portion of the arm 22 for attachment of upper end 26a of string 26 to the handle. The lower end 26b of string 26 is attached to hook 28 which is connected at the center of cross piece 19 of the stand 14. Thus, the string 26 extends along the center of arm 22 downwardly from hook 25 across the center of body 10 to the hook 28 on the cross frame 19. A magnetic pickup 30 of standard construction, such as shown in U.S. Pat. No. 2,909,092, is located centrally in the base 10 so that it is directly below the string 26. The pickup is electrically connected with an outlet 29 at one edge of the base 10 which receives plug 32 and the plug is connected to the end of wire 33 leading to a standard amplifier system (not shown).

Guide 34 is located at the lower edge of the base 10 and consists of rollers 40 and 41 which are supported by angularly shaped brackets 35 and 36 both secured to base 10 by screws 37. Short axles extend from opposite ends of each roller and are located in openings in the brackets for rotatably supporting the rollers. As is apparent in FIG. 5, the roller 40 is higher than the roller 41 and is closer to the pickup 30 than is the lower roller 41 since the rollers are vertically staggered. The surface of the rollers are adjacent one another and grooves 42 and 43 in rollers 40 and 41, respectively, are opposite one another. The two grooves 42 and 43 provide an opening past the rollers only slightly larger than the diameter of the string 26. Since the lower portion of the roller 40 is slightly below the upper portion of the roller 41, the rollers serve to cause the string 22 to make a bend as it passes through the rollers and roller 40 holds the string 22 at a fixed elevation above the base 10 and magnetic pickup 30 regardless of the angular position assumed by the base 10 about the axis of support 11. Also, the grooves in rollers 40 and 41 are in alignment with the hooks 25 and 28 so that the rollers maintain the string straight between the two hooks. The slight depression of roller 40 causes the string to engage the lower groove surface in roller 40 and the location of this groove surface determines the height of string 26.

In playing the musical instrument, the player stands to one side of the stand 14 and grips the handle 22a. He then can rotate the instrument about the support axis 11 to vary the tension of the string 26 which continually passes over the pickup 30 at a fixed height regardless of the angular position of the instrument. A backward position of arm 22 is illustrated by phantom lines in FIG. 2 wherein the string is tensioned more than when the arm is straight up as in the full line position. The change in tension will change the frequency at which the string will vibrate and thereby the output tone. The string can be a standard E string of a bass guitar or any other suitable string of a stringed instrument. It is apparent that the height of the top hook 25 will also affect the height of the string over the base 10 and the pickup. The string can be metal wound and have sufficient stretch to permit the change in tone to vary over at least one octave and a half.

What is claimed is:

1. A musical instrument comprising:

a base and an arm extending upwardly from the top edge of the base;

a handle at the upper end of said arm;

a substantially horizontal cross member connected to said base [ and extending to opposites sides of said base ];

a stand for rotatably supporting said cross member [ at opposite sides of said base ] to provide for rotation of said base and said handle about the axis of said cross member;

a first [ hook ] *attachment* connected to an upper portion of said arm and a second [ hook ] *attachment* connected to a portion of said stand below said base;

a string connected at opposite ends to said [ hooks ] *attachments* and passing over said arm and said base;

guide means located at the lower portion of said base for maintaining said string in alignment between said two [ hooks ] *attachments* and at a desired height above said base; and pickup means located in said base underneath said string and connected with an output [ at the side of said base ];

said guide means fixing the height of said string above said pickup means in order to reproduce the various tones produced by vibration of said string under varying tension determined by the angular position of said handle.

2. A musical instrument as defined in claim 1 wherein said guide means comprises a pair of staggered rollers supported at the lower portion of said base, said rollers having aligned grooves therein to receive and bend said string so as to maintain said string at the desired height over said base.

3. A musical instrument as defined in claim 1 wherein said stand comprises side members interconnected with cross pieces located at the bottom of the stand;

said second [hook] *attachment* connected to one of said cross pieces.

4. A musical instrument as defined in claim 3 wherein each of said side members has an apex at the top thereof, each side member having a curved surface at said apex for providing a bearing surface for [ the portion ] *portions* of said cross member *extending* at opposite sides of said base.

*5. A musical instrument comprising:*

*a base and an arm extending upwardly from the top edge of the base;*

*a handle portion at the upper end of said arm;*

*base support means having an axis of rotation transverse of said base; and*

*a stand for rotatably supporting said base support means to provide for rotation of said base and said handle about said axis of said base support means;*

*a first attachment connected to an upper portion of said arm and a second attachment connected to a portion of said stand below said base;*

*a string connected at opposite ends to said attachments and passing over said arm and said base;*

*guide means located at the lower portion of said base for maintaining said string in alignment between said two attachments and at a desired height above said base; and*

*pickup means located in said base underneath said string and connected with an output;*

*said guide means fixing the height of said string above said pickup means in order to reproduce the various tones produced by vibration of said string under varying tension determined by the angular position of said handle.*

* * * * *